(12) United States Patent
Sugihara

(10) Patent No.: US 6,846,264 B2
(45) Date of Patent: Jan. 25, 2005

(54) TOROIDAL CONTINUOUSLY VARIABLE TRANSMISSION

(75) Inventor: Jun Sugihara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 116 days.

(21) Appl. No.: 10/228,986

(22) Filed: Aug. 28, 2002

(65) Prior Publication Data

US 2003/0054918 A1 Mar. 20, 2003

(30) Foreign Application Priority Data

Sep. 19, 2001 (JP) ........................................ 2001-285093

(51) Int. Cl.[7] ............................................. F16H 15/38
(52) U.S. Cl. ........................................... 476/40; 476/42
(58) Field of Search ............................. 476/40, 42, 46; 403/61, 73, 116

(56) References Cited

U.S. PATENT DOCUMENTS

| 266,556 | A | * | 10/1882 | Traut | 403/61 |
|---|---|---|---|---|---|
| 1,265,999 | A | * | 5/1918 | Cusanelli | 297/142 |
| 2,340,970 | A | * | 2/1944 | Lustrik | 403/61 |
| 2,676,043 | A | * | 4/1954 | Roethel | 403/61 |
| 2,772,901 | A | * | 12/1956 | Roethel | 403/61 |
| 5,893,815 | A | | 4/1999 | Nakano | |
| 6,461,270 | B2 | * | 10/2002 | Oshidari | 476/42 |
| 2001/0016534 | A1 | | 8/2001 | Oshidari | |

* cited by examiner

Primary Examiner—William C. Joyce
(74) Attorney, Agent, or Firm—Foley & Lardner LLP

(57) ABSTRACT

A toroidal continuously variable transmission including input and output disks rotatable about a common first axis, and power rollers interposed therebetween and supported on trunnions to rotate about a second axis. The trunnions are displaceable along a third axis extending perpendicular to the second axis and pivotally moveable about the third axis. A link connects the trunnions. A link support supports the link to allow the displacement and pivotal movement of the trunnions. A pin extending parallel to the first axis and a pin guide having an open end cooperate to support the link so as to swing about the pin and offset along the third axis. The pin is disposed on one of the link and the link support, and the pin guide is disposed on the other. Upon mounting the link to the link support, the pin is radially inserted into the pin guide through the open end.

18 Claims, 6 Drawing Sheets

TOROIDAL CONTINUOUSLY VARIABLE TRANSMISSION

BACKGROUND OF THE INVENTION

The present invention relates to a toroidal continuously variable transmission (CVT) having an improved structure of supporting power rollers which serves for enhancing assembly efficiency of the toroidal CVT, and a method of assembling the toroidal CVT with the power rollers supporting structure.

Generally, toroidal CVTs have input and output disks arranged to be rotatable about a common rotation axis, and a plurality of power rollers interposed between the input and output disks in contact therewith via a working fluid (traction oil). These power rollers are supported on trunnions so as to rotate about rotation axes and pivotally move about pivot axes perpendicular to the rotation axes thereof. Upon operating the toroidal CVTs, the power rollers are pressed by the input and output disks undergoing a load corresponding to a transmission torque. A shear force of the working fluid is caused corresponding to the pressing force applied to the power rollers. Owing to the shear force, the power rollers transmit power between the input and output disks. The power rollers, therefore, tend to be pushed out from a toroidal cavity formed between the input and output disks. In order to avoid the push-out of the power rollers, opposed end portions of each trunnion supporting the power roller are connected with those of the adjacent trunnion via links, respectively. Upon the speed change operation of the toroidal CVT, the respective trunnions are driven by a servo piston to synchronously displace or offset from the non-speed change position where the rotation axes of the power rollers are perpendicular to the common rotation axis of the input and output disks, along a direction of the pivot axes of the power rollers at the identical stroke. In this condition, the trunnions with the power rollers are allowed to pivotally move about the pivot axes due to component of force of the rotation of the input disk.

U.S. Pat. No. 5,893,815 (corresponding to Japanese Patent Application First Publication No. 9-317837) discloses a toroidal CVT including a link which is swingably supported on a transmission case via link posts and pins. Each pin is fixed to the link and swingably engaged in a hole of the link post. Upon assembling the toroidal CVT, the link posts are preassembled to the link using the pins, and then the preassembled link posts are fixed to the transmission case. Thus, the link is swingably mounted to the transmission case so as to permit the above-described offset motion of the trunnions in the direction of the pivot axes.

United States Patent Application Publication No. US 2001/0016534 A1 (corresponding to Japanese Patent Application First Publication No. 2001-182793) discloses a toroidal CVT including a link which connects a pair of front trunnions and a pair of rear trunnions with each other. The link is swingably supported on a transmission case via link supports and pins. The pins are fixed to the link supports and engaged in oval holes of the link which are elongated in a direction of pivot axes of power rollers supported on the respective front and rear trunnions, but are not open to an outer periphery of the link. This permits the link to swingably move along the direction of the pivot axes. Even when one of each pair of trunnions interferes with the link during the offset motion thereof, the other of the each pair of trunnions can be free from the interference force that will be exerted on the other via the pins acting as a fulcrum. If the interference force is exerted on the other, distribution of the torque to the power rollers on the front and rear trunnions will be deteriorated. Upon assembling the toroidal CVT, the link supports with the pins are preassembled to the link by inserting the pins into the elongated holes. The preassembled link supports then are mounted to the transmission case, so that the link is swingably supported on the transmission case.

SUMMARY OF THE INVENTION

The preliminary assembly work of the link supports and the link supports to the link is cumbersome due to the insertion operation of the pins thereof to the holes of the link. Further, in the above-described US 2001/0016534 A1, the operation of mounting the preassembled link supports to the transmission case is more cumbersome. This is because the preassembled link supports must be mounted to the transmission case in an unstable state in which the pins of the link supports are displaceable within the elongated holes of the link. Therefore, the mounting operation of the link supports will be deteriorated in efficiency, leading to deterioration in efficiency of the assembly operation of the toroidal CVT. Further, if the pins are press-fitted to the link supports while being kept engaged in the elongated holes of the link, the press-fitting operation of the pins to the link supports will be inconvenient, and therefore, the efficiency of an assembly operation of the toroidal CVT will be deteriorated. In addition, the formation of the elongated holes in the link is inferior in machinability, causing increase in cost.

In consideration of the above-described problems of the related arts, the object of the present invention is to provide a toroidal CVT with a power rollers support structure in which a preassembly operation of link supports to a link can be omitted upon assembling the toroidal CVT to thereby improve the efficiency of the assembly operation of the toroidal CVT.

In one aspect of the present invention, there is provided a toroidal continuously variable transmission, comprising:

input and output disks rotatable about a common first axis;

power rollers interposed between the input and output disks;

trunnions supporting the power rollers to allow the power rollers to rotate about a second axis, respectively, the trunnions being displaceable along a third axis which extends perpendicular to the second axis, the trunnions being pivotally moveable about the third axis together with the power rollers by cooperation with rotation of the input and output disks;

a link connecting the trunnions;

a link support supporting the link to allow the displacement of the trunnions along the third axis and the pivotal movement of the trunnions about the third axis;

a pin extending in a direction parallel to the common first axis, the pin being disposed on one of the link and the link support; and a pin guide guiding the pin in the direction of the third axis, the pin guide having an open end which permits the pin to be radially inserted into the pin guide, the pin guide being disposed on the other of the link and the link support, the pin and the pin guide cooperating to hold the link in place in a direction perpendicular to the common first axis and support the link to allow the link to swing about the pin and offset in the direction of the third axis.

In a further aspect of the present invention, there is provided a method of assembling a toroidal continuously variable transmission which includes a transmission case having a bottom opening, a toroidal speed change unit disposed within the transmission case, the toroidal speed change unit including input and output disks rotatable about a common first axis, power rollers interposed between the input and output disks, trunnions supporting the power rollers to allow the power rollers to rotate about a second axis, respectively, the trunnions being displaceable along a third axis which extends perpendicular to the second axis, the trunnions being pivotally moveable about the third axis together with the power rollers by cooperation with rotation of the input and output disks, a link connecting the trunnions, a link support supporting the link to allow the displacement of the trunnions along the third axis and the pivotal movement of the trunnions about the third axis, a pin extending in a direction parallel to the common first axis, the pin being disposed on one of the link and the link support, and a pin guide guiding the pin in the direction of the third axis, the pin guide having an open end, the pin guide being disposed on the other of the link and the link support, the pin and the pin guide cooperating to hold the link in place in a direction perpendicular to the common first axis and support the link to allow the link to swing about the pin and offset in the direction of the third axis, the method comprising:

placing the transmission case at an upset state such that the bottom opening is located on an upper side of the transmission case;

inserting the link into the transmission case through the bottom opening and mounting the link to the trunnions;

mounting the link to the link support; and radially inserting the pin into the pin guide through the open end of the pin guide upon mounting the link to the link support.

BEST MODE FOR CARRYING OUT THE INVENTION

Figure 1:
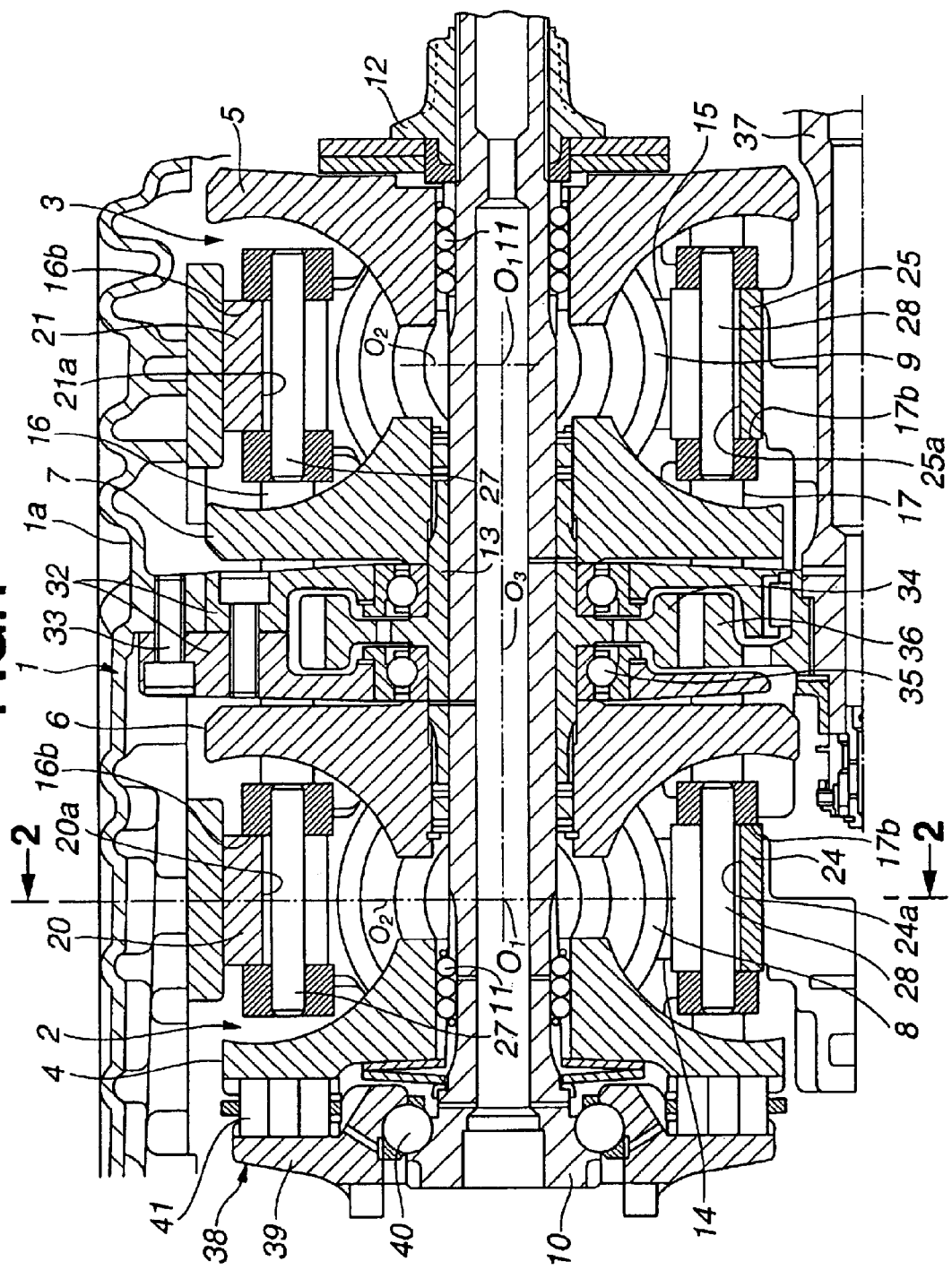
FIG. 1 is a longitudinal and vertical cross-section of an essential part of a toroidal continuously variable transmission (CVT) with a power rollers support structure according to a first embodiment of the present invention.

Referring now to FIGS. 1–4, there is shown a dual cavity toroidal CVT having a power rollers support structure of a first embodiment of the present invention. As illustrated in FIG. 1, the dual cavity toroidal CVT includes transmission case 1, main shaft 10 rotatably supported within transmission case 1, and front toroidal speed change unit 2 and rear toroidal speed change unit 3 which are arranged in an adjacent relation to each other along main shaft 10.

Front toroidal speed change unit 2 and rear toroidal speed change unit 3 are coaxially arranged within transmission case 1. Each toroidal speed change unit 2, 3 includes coaxially arranged input disk 4, 5 and output disk 6, 7, and power rollers 8, 9 disposed between input and output disks 4 and 6, 5 and 7. Input and output disks 4–7 are supported on main shaft 10 so as to rotate about common rotation axis $O_3$ aligned with an axis of main shaft 10. Input disks 4 and 5 are rotatably engaged with main shaft 10 via ball spline 11 and axially slidable on main shaft 10. Rear-side input disk 5 is prevented from being removed from main shaft 10 by loading nut 12 screwed on main shaft 10 and disc spring 29 adjacent to loading nut 12. Output disks 6 and 7 are connected with each other via hollow output shaft 13 rotatably supported on main shaft 10. Output disks 6 and 7 are arranged back-to-back in an axially spaced relation to each other, between which gear housing 32 is interposed. Power rollers 8 and 9 transmit power between input and output disks 4–7 via a traction oil film formed between power rollers 8 and 9 and input and output disks 4–7. Power rollers 8 and 9 are diametrically opposed to each other with respect to rotation axis $O_3$ of input and output disks 4–7.

Figure 2:
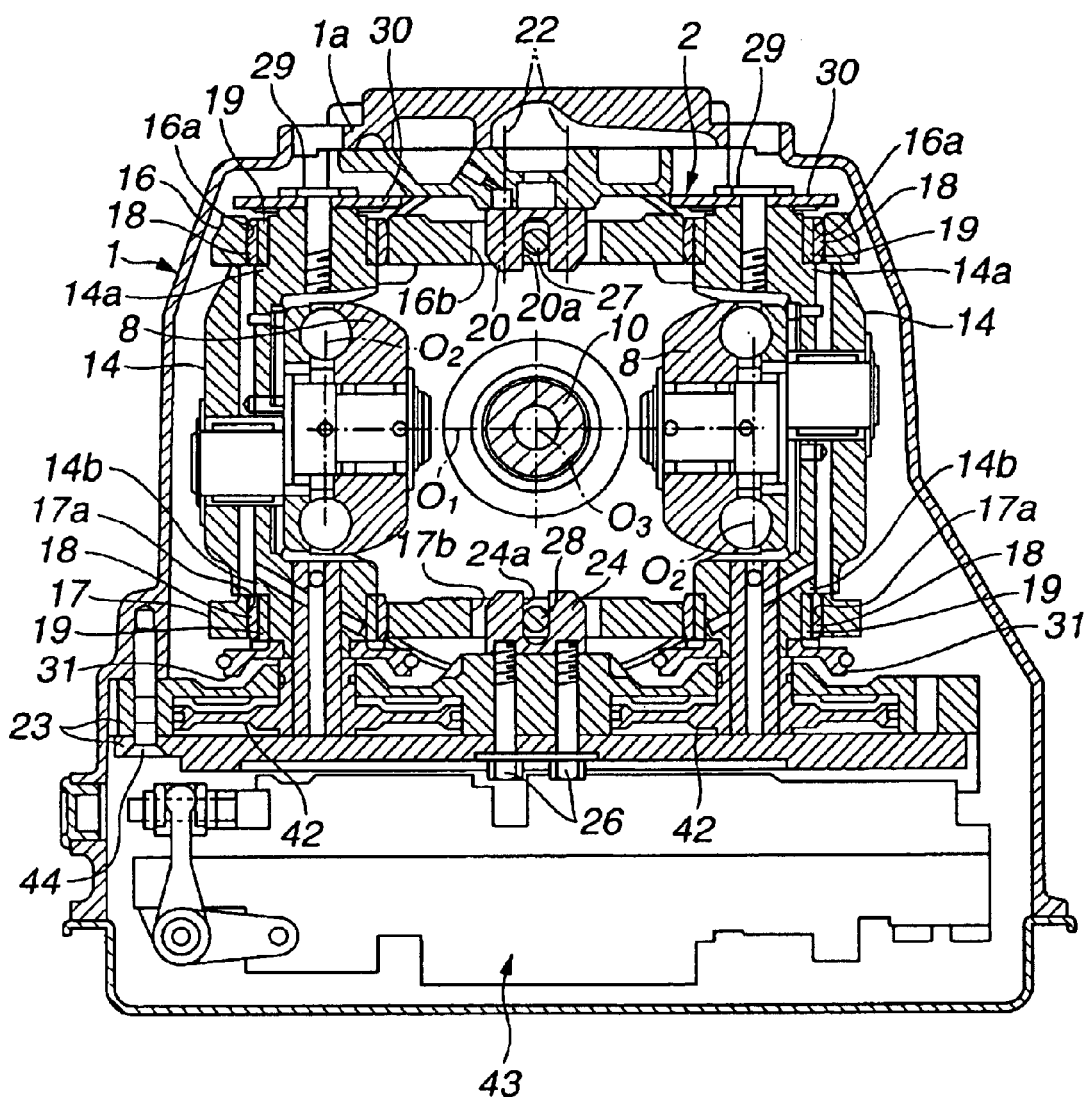
FIG. 2 is a cross-section taken along line 2—2 of FIG. 1.
Figure 3:
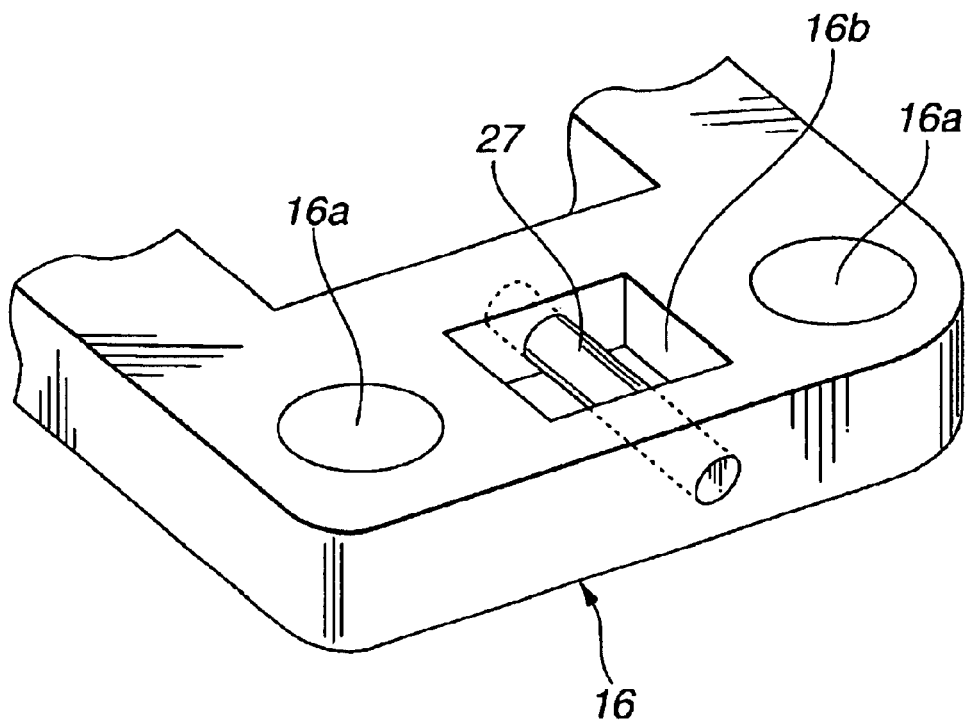
FIG. 3 is a perspective view of an upper link of the toroidal CVT of FIG. 1, showing the essential part.

Power rollers 8 and 9 are supported on trunnions 14 and 15, respectively, so as to be rotatable about rotation axis $O_1$. Only two trunnions 14 of front toroidal speed change unit 2 are illustrated in FIG. 2, but two rear trunnions 15 of rear toroidal speed change unit 3 has the same configuration. As illustrated in FIG. 1, front and rear trunnions 14 and 15 have upper end portions which are disposed near top wall 1a of transmission case 1. The upper end portions of front and rear trunnions 14 and 15 are connected with four corners of a generally rectangular plate-shaped upper link 16. Upper link 16 is formed with trunnion mount holes 16a at the four corners thereof, only two of which are shown in FIG. 3. The upper end portions of front and rear trunnions 14 and 15 are introduced into respective trunnion mount holes 16a of upper link 16. Similarly, lower end portions of front and rear trunnions 14 and 15 are connected with four corners of a generally rectangular plate-shaped lower link 17. Lower link 17 has substantially the same configuration as that of upper link 16 and trunnion mount holes 17a at the four corners thereof into which the lower end portions of front and rear trunnions 14 and 15 are introduced. Two of trunnion mount holes 17a for the lower end portions of front trunnions 14 are shown in FIG. 2. Front and rear trunnions 14 and 15 are rotatably and angularly moveably joined to upper and lower links 16 and 17 via a combined joint. The combined joint is formed by spherical joint 18 fitted into trunnion mount holes 16a and 17a and roller bearing 19 installed between spherical joint 18 and each of upper and lower end portions of front and rear trunnions 14 and 15. Upper and lower links 16 and 17 hold front and rear trunnions 14 and 15 in place such that power rollers 8 and 9 can be prevented from being pushed out from the cavity formed by input and output disks 4, 6 and 5, 7 by a loading force applied to input and output disks 4, 6 and 5, 7 as explained later.

As illustrated in FIG. 1, upper link supports 20 and 21 for supporting upper link 16 are mounted to transmission case 1. Upper link support 20 is located on the front side of gear housing 32 as shown in FIG. 1 and between the upper end portions of front trunnions 14 as shown in FIG. 2. Upper link support 20 is fixed to transmission case 1 by means of bolts, center lines of which are indicated at 22 in FIG. 2. Upper link support 21 is located on the rear side of gear housing 32 as shown in FIG. 1 and between the upper end portions of rear trunnions 15 as shown in FIG. 2. Upper link support 21 is fixed to transmission case 1 by means of bolts (not shown). As shown in FIG. 1, lower link supports 24 and 25 are mounted to transmission case 1 and disposed on the front side and the rear side of gear housing 32, respectively. As shown in FIG. 2, lower link support 24 is located between the lower ends of front trunnions 14 and fixed to transmission case 1 via servo piston body 23 by means of bolts 26. Servo piston body 23 is secured to near a bottom opening of transmission case 1. Upon mounting lower link support 24 to transmission case 1, bolts 26 are inserted into servo piston body 23 through the bottom opening of transmission case 1 and fasten bolts 26 thereto. Similarly, lower link support 25 is located between the lower ends of rear trunnions 15 and fixed to transmission case 1 via servo piston body 23 by means of bolts (not shown). Lower link support 25 is mounted to transmission case 1 in the same manner using bolts as explained above.

As seen from FIGS. 1–2, upper link 16 are formed with link support insertion holes 16b, 16b into which link supports 20 and 21 are introduced, and lower link 17 are formed with link support insertion holes 17b, 17b into which link supports 24 and 25 are introduced. Pins 27, 27 extend across link support insertion holes 16b, 16b of upper link 16 in the direction parallel to rotation axis $O_3$ of input and output disks 4–7. FIG. 3 shows a state of pin 27 across link support insertion hole 16b. Pins 28, 28 extend across link support insertion holes 17b, 17b of lower link 17 in the direction parallel to rotation axis $O_3$ of input and output disks 4–7.

Figure 4:
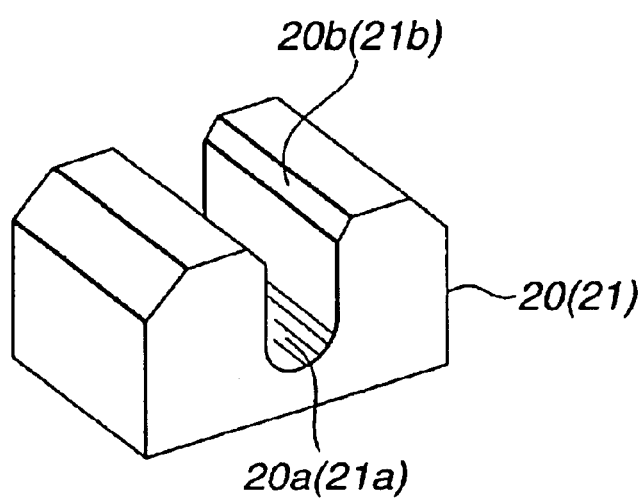
FIG. 4 is a perspective view of a link support of the toroidal CVT of FIG. 1.

As illustrated in FIGS. 1 and 4, upper link supports 20 and 21 are formed with pin guides 20a and 21a, respectively. Pin guides 20a and 21a are in the form of grooves which extend in the direction parallel to rotation axis $O_3$ of input and output disks 4–7 as shown in FIG. 1 and in the direction parallel to pivot axis $O_2$ of each of power rollers 8 and 9, namely, a longitudinally extending axis of each trunnion 14 and 15, as shown in FIG. 2. Each of pin guides 20a and 21a has a U-shaped section shown in FIG. 2, and an open end open to an outer surface of each of link supports 20 and 21 which is located closer to rotation axis $O_3$ of input and output disks 4–7 as viewed along pivot axis $O_2$ in FIG. 2. Pin guides 20a and 21a allow pins 27, 27 to be radially inserted thereinto through the open ends thereof and guided to be engaged therewith when link supports 20 and 21 are introduced into link support insertion holes 16b, 16b of upper link 16 upon assembling the toroidal CVT as explained later. As best shown in FIG. 4, pin guides 20a and 21a have chamfered edges 20b and 21b at the open ends which are so configured to facilitate the radial insertion of pins 27, 27 into pin guides 20a and 21a therealong.

As illustrated in FIG. 1, lower link supports 24 and 25 are formed with pin guides 24a and 25a, respectively. Pin guides 24a and 25a are in the form of grooves which extend in the direction parallel to rotation axis $O_3$ of input and output disks 4–7 as shown in FIG. 1 and in the direction parallel to pivot axis $O_2$ of each of power rollers 8 and 9 as shown in FIG. 2. Each of pin guides 24a and 25a has a U-shaped section shown in FIG. 2 and an open end open to an outer surface of each of link supports 24 and 25 which is located closer to rotation axis $O_3$ of input and output disks 4–7 as viewed along pivot axis $O_2$ in FIG. 2. Pin guides 24a and 25a allow pins 28, 28 to be radially inserted into pin guides 24a and 25a through the open ends thereof and guided to be engaged therewith when link supports 24 and 25 are introduced into openings 17b, 17b of lower link 17 upon assembling the toroidal CVT. Similar to pin guides 20a and 21a, pin guides 24a and 25a have chamfered edges at the open ends thereof which are so configured as to facilitate the radial insertion of pins 28, 28 into pin guides 24a and 25a therealong.

With the cooperation of pins 27, 27 and pin guides 20a and 21a, upper link 16 is supported relative to link supports 20 and 21 and transmission case 1 in such a manner as to be swingable about pins 27, 27 and displaceable in the direction of pivot axes $O_2$ of power rollers 8 and 9, namely, in the direction of longitudinally extending axes of front and rear trunnions 14 and 15. Further, with the cooperation of pins 27, 27 and pin guides 20a and 21a, upper link 16 can be held in place in the direction of rotation axes $O_1$ of power rollers 8 and 9 upon mounting upper link 16 to link supports 20 and 21. Similarly, pins 28, 28 and pin guides 24a and 25a cooperate to support lower link 17 relative to link supports 24 and 25, servo piston body 23 and transmission case 1, so as to be swingable about pins 28, 28 and displaceable in the direction of pivot axes $O_2$ of power rollers 8 and 9. Pins 28, 28 and pin guides 24a and 25a also cooperate to hold lower link 17 in place in the direction of rotation axes $O_1$ of power rollers 8 and 9 upon mounting lower link 17 to link supports 24 and 25. Furthermore, when link supports 20 and 21 are inserted into link support insertion holes 16b, 16b upon assembling, link supports 20 and 21 are used for positioning of upper link 16 in a direction parallel to rotation axis $O_3$ of input and output disks 4–7. Similarly, link supports 24 and 25 are used for positioning of lower link 17 in a direction parallel to rotation axis $O_3$ of input and output disks 4–7 upon being inserted into link support insertion holes 17b, 17b.

The above-described swing motions of upper and lower links 16 and 17 are limited in the following manners in order to prevent interference with components other than trunnions 14 and 15. Upper link 16 is interposed with a clearance between upper step portions of trunnions 14 and 15 and stop plates 30 disposed at upper ends of trunnions 14 and 15. The clearance is so preset as to permit the swing motion of upper link 16 along pivot axis $O_2$. The upper step portions of front trunnions 14 which are indicated at 14a in FIG. 2, retain spherical joint 18 and roller bearing 19 thereon. Stop plates 30 are fixed to the upper ends of trunnions 14 and 15 which project from trunnion mount holes 16a of upper link 16, by means of bolts 29. Each stop plate 30 has a diameter larger than that of each trunnion mount hole 16a. Lower link 17 is interposed with a clearance between lower step portions of trunnions 14 and 15 and wire pulleys 31 disposed at lower ends of trunnions 14 and 15. The clearance is so preset as to permit the swing motion of lower link 17 along pivot axis $O_2$. The lower step portions of front trunnions 14 which are indicated at 14b in FIG. 2, retain spherical joint 18 and roller bearing 19 thereon. Wire pulleys 31 are secured to the lower ends of trunnions 14 and 15 which project from trunnion mount holes 17a of lower link 17. Wire pulleys 31 are provided for synchronous pivot operation of front and rear toroidal speed change units 2 and 3.

Referring back to FIG. 1, gear housing 32 acts as an intermediate wall between front and rear toroidal speed change units 2 and 3. Gear housing 32 is constituted of front and rear halves and fixed to transmission case 1 by means of fastening bolts 33. Gear housing 32 accommodates output gear 34 integrally formed with hollow output shaft 13. Output gear 34 is meshed with counter gear 36 connected with counter shaft 37. Gear housing 32 supports a middle portion of main shaft 10 so as to be rotatable relative to transmission case 1 via ball bearing 35.

Loading cam 38 transmits input rotation transmitted thereto to respective input disks 4 and 5 of front and rear toroidal speed change units 2 and 3. Loading cam 38 includes cam flange 39 which is coaxially disposed with front input disk 4 and rotatably supported on main shaft 10 by means of radial and thrust bearing 40, and cam roller 41 interposed between input disk 4 and cam flange 39. Loading cam 38 transmits the input rotation to front input disk 4 and then rear input disk 5 via ball spline 11 and main shaft 10. Loading cam 38 also applies a thrust load which is caused by a relative rotation of cam flange 39 and front input disk 4 corresponding to the transmitted torque, to front input disk 4. Front input disk 4 is urged toward front output disk 6 by the thrust load. Reaction force to the thrust load is transmitted from cam flange 39 to rear input disk 5 via radial and thrust bearing 40, main shaft 10 and loading nut 12, so that rear input disk 5 is urged toward rear output disk 7. As a result, power rollers 8 and 9 are pressed onto input and output disks 4, 6 and 5, 7, respectively, by the force corresponding to the transmitted torque. This can transmit power between input and output disks 4–7 via power rollers 8 and 9.

Servo pistons 42 are coaxially connected with the lower ends of front trunnions 14 and rear trunnions 15. FIG. 2 shows servo pistons 42 for front trunnions 14. Servo pistons 42 are slidably disposed within servo piston body 23 and define servo piston chambers on upper and lower sides of respective servo pistons 42. Servo pistons 42 are operated by control valve 43 controlling fluid pressure supplied to servo piston chambers, so as to synchronously stroke or offset trunnions 14 and 15 in the same phase (in the same speed-change direction).

Upon the speed change operation of the toroidal CVT, input rotation is transmitted to front input disk 4 and rear output disk 5 via loading cam 38 as described above. The rotation of input disks 4 and 5 is transmitted to power rollers 8 and 9 via the traction oil film formed between input disks 4 and 5 and power rollers 8 and 9. At this time, power rollers 8 and 9 are rotated about rotation axes $O_1$, $O_1$ and transmit the rotation to output disks 6 and 7 via the traction oil film formed between output disks 6 and 7 and power rollers 8 and 9. The rotation of output disks 6 and 7 is then transmitted to counter shaft 37 via output gear 34 and counter gear 36. Thus, power can be taken from counter shaft 37.

Power rollers 8 and 9 are operated via trunnions 14 and 15 driven by servo piston 42. When trunnions 14 and 15 are driven to synchronously move along pivot axis $O_2$ at the identical stroke, power rollers 8 and 9 are synchronously offset from initial positions (non-speed change positions) shown in FIGS. 1 and 2 along pivot axis $O_2$ at the identical stroke. As a result, rotation axes $O_1$ of power rollers 8 and 9 are offset from rotation axis $O_3$ of input and output disks 4–7, and power rollers 8 and 9 are synchronously pivoted about pivot axis $O_2$ with the identical phase by component of force of the rotation of input disks 4 and 5. This causes continuous change in size of circles traced by contact points between input disks 4 and 5 and power rollers 8 and 9 and circles traced by contact points between power rollers 8 and 9 and output disks 6 and 7. Speed change ratio between input and output disks 4 and 6 and speed change ratio between input and output disks 5 and 7 can be continuously varied while being kept equal to each other. When the speed change ratios reach a preset value, the speed change ratios can be maintained by operating power rollers 8 and 9 to move to the initial positions.

As described above, since pin guides 20a, 21a, 24a and 25a are in the form of grooves extending in the direction of pivot axis $O_2$, pins 27 and 28 can be displaced along pin guides 20a, 21a, 24a and 25a. This can prevent deterioration of torque distribution to power rollers 8 and 9 supported on trunnions 14 and 15 due to the interference of trunnions 14 and 15 with upper and lower links 16 and 17 during the offset motion of trunnions 14 and 15 upon the speed change operation. This serves for avoiding slippage of power rollers 8 and 9 on input and output disks 4–7 due to the deterioration of torque distribution to power rollers 8 and 9.

A method of assembling the toroidal CVT having the power rollers support structure, according to the invention, will be explained hereinafter. Transmission case 1 is placed at an upset state such that top wall 1a is located on a lower side of transmission case 1 and a bottom opening of transmission case 1 is located on an upper side of transmission case 1. Upper link supports 20 and 21 are inserted into transmission case 1 through the bottom opening thereof and fixed to an inner surface of top wall 1a using bolts as indicated at 22 in FIG. 2. Trunnions 14 and 15 are preassembled to upper link 16 by mounting one end portions, namely, the upper end portions as shown in FIG. 2, of trunnions 14 and 15 to trunnion mount holes 16a of upper link 16. Next, upper link 16 with trunnions 14 and 15 is inserted into transmission case 1 through the bottom opening, and then upper link supports 20 and 21 are introduced into link support insertion holes 16b, 16b of upper link 16. Upon introducing upper link supports 20 and 21, pins 27, 27 are radially inserted into pin guides 20a and 21a through the open ends of pin guides 20a and 21a and guided to be engaged therewith. Upper link 16 can be held in place in the direction of rotation axis $O_1$ of each power roller 8 and 9 and in the direction parallel to rotation axis $O_3$ of input and output disks 4–7. Upper link 16 also can be offset along pivot axis $O_2$ of each power roller 8 and 9 and swingably move about pins 27, 27.

Subsequently, lower link 17 is assembled to transmission case 1 in the following manner. Lower link 17 is inserted into transmission case 1 through the bottom opening and then mounted to the opposite end portions of trunnions 14 and 15 via trunnion mount holes 17a of lower link 17. Next, servo piston body 23 to which lower link supports 24 and 25 are previously secured using bolts 26 is inserted into the bottom opening of transmission case 1 such that lower link supports 24 and 25 are introduced into link support insertion holes 17b, 17b of lower link 17. Servo piston body 23 is fixed to transmission case 1 using bolts 44 as shown in FIG. 2. Upon introducing lower link supports 24 and 25, pins 28, 28 are radially inserted into pin guides 24a and 25a through the open ends of pin guides 24a and 25a and guided to be engaged therewith. Lower link 17 can be held in place in the direction of rotation axis $O_1$ of each power roller 8 and 9 and in the direction parallel to rotation axis $O_3$ of input and output disks 47. Lower link 17 also can be offset along pivot axis $O_2$ of each power roller 8 and 9 and swingably move about pins 28, 28.

With the power rollers support structure as described above, an operation of preassembling upper link supports 20 and 21 and lower link supports 24 and 25 to upper link 16 and lower link 17 can be omitted. This will prevent deterioration in assembly efficiency of the power rollers support structure and assembly efficiency of the toroidal CVT. Further, the radial insertion work of pins 27 and 28 respectively fixed to upper and lower links 16 and 17 into pin guides 20a, 21a and 24a, 25a can be easily performed. This serves for preventing deterioration in assembly efficiency of the power rollers support structure. Furthermore, each pin guide 20a, 21a and 24a, 25a in the form of the open-ended groove open to the outer surface of each link support 20 and 21 can be better in machinability and cost-saving as compared with the oval hole used in the above-described related art.

In addition, upper and lower links 16 and 17 are prevented from suffering deterioration in rigidity because grooves 20a, 21a, 24a and 25a as pin guides are not formed therein but formed in link supports 20, 21, 24 and 25. This will suppress increase in thickness of links 16 and 17, serving for avoiding increase in weight thereof. Further, pin guides 20a, 21a, 24a and 25a have the U-shape in section and the open ends open to the outer surfaces which are located closer to rotation axis $O_3$ of input and output disks 4–7, namely, the outer surfaces facing rotation axis $O_3$ of input and output disks 4–7 as shown in FIG. 2. Therefore, pins 27 and 28 can be easily inserted from the open end into pin guides 20a, 21a, 24a and 25a upon the above-described assembly operation of the power rollers support structure. Thus, upper link 16 and lower link 17 can be readily supported on upper link supports 20 and 21 and lower link supports 24 and 25, respectively. Further, pins 27 and 28 extend across link support insertion holes 16b and 17b and act as pivots of the swing motion of respective links 16 and 17. The pivot centers, therefore, are located within the thickness range of links 16 and 17. This serves for preventing increase in size of the power rollers support structure.

Figure 5:
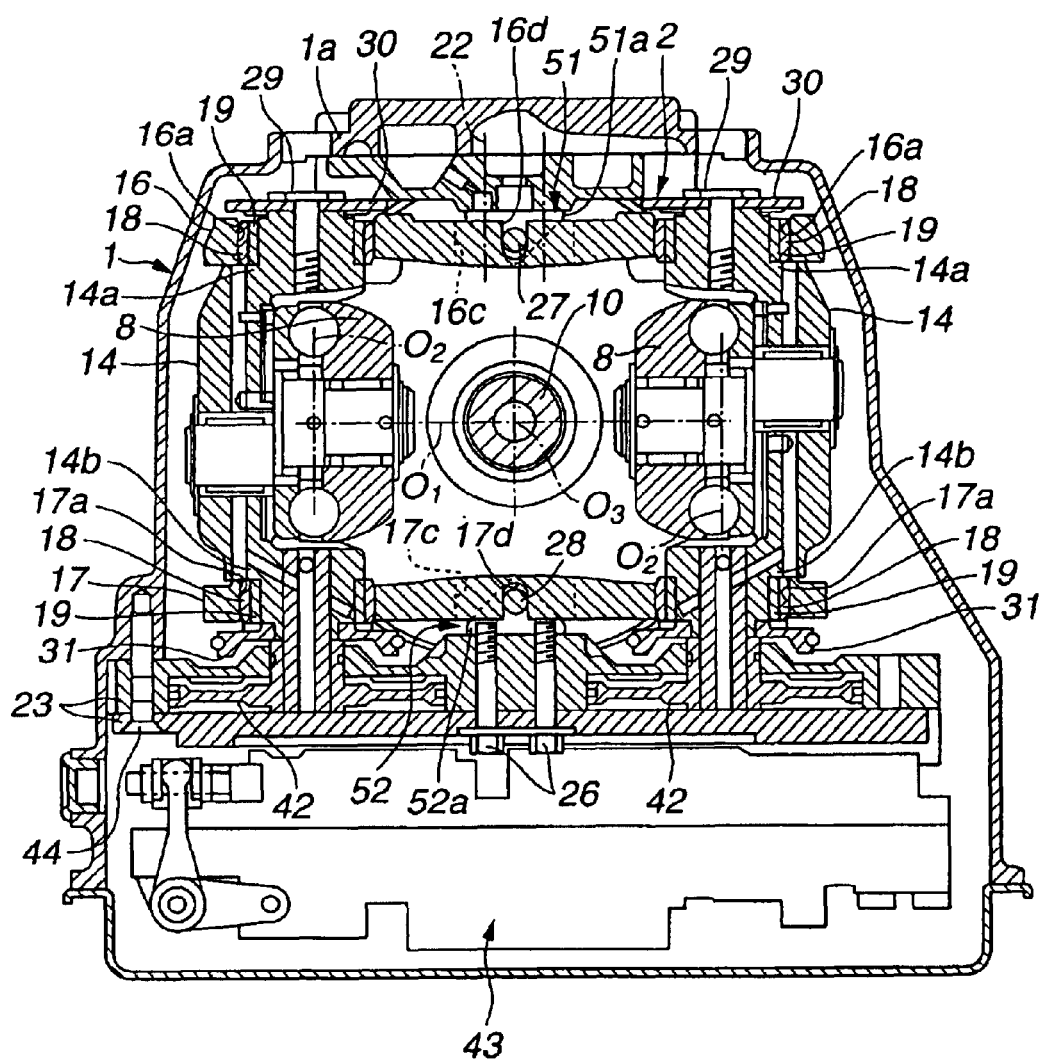
FIG. 5 is a cross-section similar to FIG. 1, but showing the power rollers support structure according to a second embodiment of the present invention.
Figure 6:
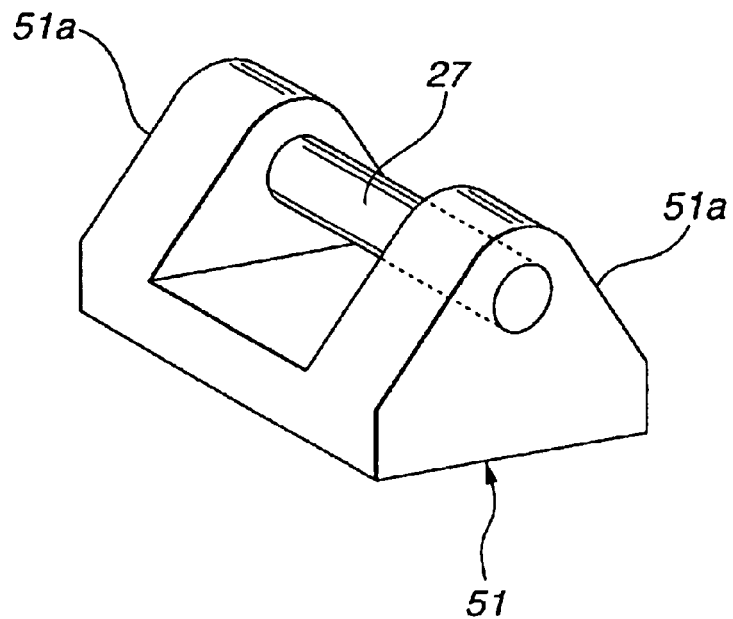
FIG. 6 is a view similar to FIG. 4, but showing a link support of the second embodiment.
Figure 7:
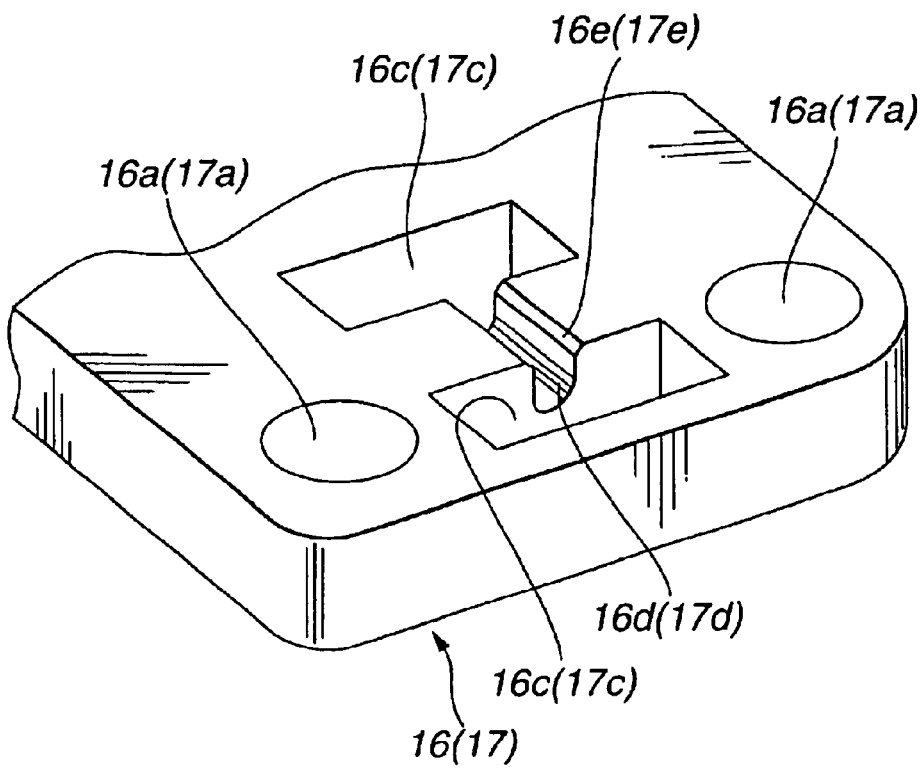
FIG. 7 is a view similar to FIG. 3, but showing an upper link of the second embodiment.

Referring now to FIGS. 5–7, a second embodiment of the power rollers support structure of the invention is explained. For the purpose of simple illustration, FIGS. 5–7 illustrate only the power rollers support structure of front toroidal speed change unit 2. The second embodiment differs from the first embodiment in that pins 27 and 28 are provided on link supports 51 and 52 and that pin guides 16d and 17d are provided on links 16 and 17. Like reference numerals denote like parts, and therefore, detailed explanations therefor are omitted. As illustrated in FIG. 5, upper link support 51 is mounted to transmission case 1, and lower link support 52 is mounted to transmission case 1 via servo piston body 23.

As illustrated in FIG. 6, upper link support 51 is in the form of a generally U-shaped bracket having two arms 51a, 51a. Arms 51a, 51a are opposed to and spaced from each other in the direction of rotation axis $O_3$ of input and output disks 4–7. Arms 51a, 51a retain opposite ends of pin 27. Lower link support 52 is in the form of a generally U-shaped bracket similar to the generally U-shaped bracket of upper link support 51. Two opposed and spaced arms 52a, 52a retain opposite ends of pin 28.

As illustrated in FIG. 7, upper link 16 and lower link 17 are formed with link support insertion holes 16c and 17c, respectively. Specifically, arms 51a, 51a of the U-shaped bracket as upper link support 51 are introduced into link support insertion holes 16c, 16c and engaged therein. Arms 52a, 52a of the U-shaped bracket as lower link support, 52 are introduced into link support insertion holes 17c, 17c and engaged therein. Pin guide 16d for pin 27 is provided in upper link 16 and in the form of a groove extending between link support insertion holes 16c, 16c. Upon introducing arms 51a, 51a of the U-shaped bracket into holes 16c, 16c, pin 27 is inserted into pin guide 16d. Pin guide 17d for pin 28 is provided in lower link 17 and in the form of a groove extending between link support insertion holes 17c, 17c. Upon introducing arms 52a, 52a of the U-shaped bracket into holes 17c, 17c, pin 28 is inserted into pin guide 17d. Each of pin guides 16d and 17d has a U-shaped section as shown in FIG. 5. As illustrated in FIG. 5, pin guide 16d extends in the direction parallel to pivot axis $O_2$ of power rollers 8, 8 and has an open end open to an upper surface of upper link 16. The upper surface of upper link 16 is located farther apart from rotation axis $O_3$ than a lower surface thereof as viewed along pivot axis $O_2$ in FIG. 5. As shown in FIG. 5, pin guide 17d extends in the direction parallel to pivot axis $O_2$ of power rollers 8, 8 and has an open end open to a lower surface of lower link 17. The lower surface of lower link 17 is located farther apart from rotation axis $O_3$ than an upper surface thereof as viewed along pivot axis $O_2$ in FIG. 5. As illustrated in FIG. 7, pin guides 16d and 17d have chamfered edges 16e and 17e at the open ends which are so configured as to facilitate radial insertion of pins 27 and 28 into pin guides 16d and 17d therealong. The assembly operation of the toroidal CVT having the power rollers support structure of the second embodiment can be performed in the same manner as described in the first embodiment.

With the structure of the second embodiment, upper and lower links 16 and 17 can be swingably supported on transmission case 1. This serves for improving assembly efficiency of the toroidal CVT as explained in the first embodiment. Further, upper and lower links 16 and 17 can be held in place in the direction of rotation axis $O_3$ of input and output disks 4–7 upon arms 51a, 51a and 52a, 52a of upper and lower link supports 51 and 52 being inserted into link support insertion holes 16c, 16c and 17c, 17c, respectively. Furthermore, pivot centers of the swing motion of links 16 and 17 are located within the thickness range of links 16 and 17. This serves for preventing increase in size of the power rollers support structure.

Figure 8:
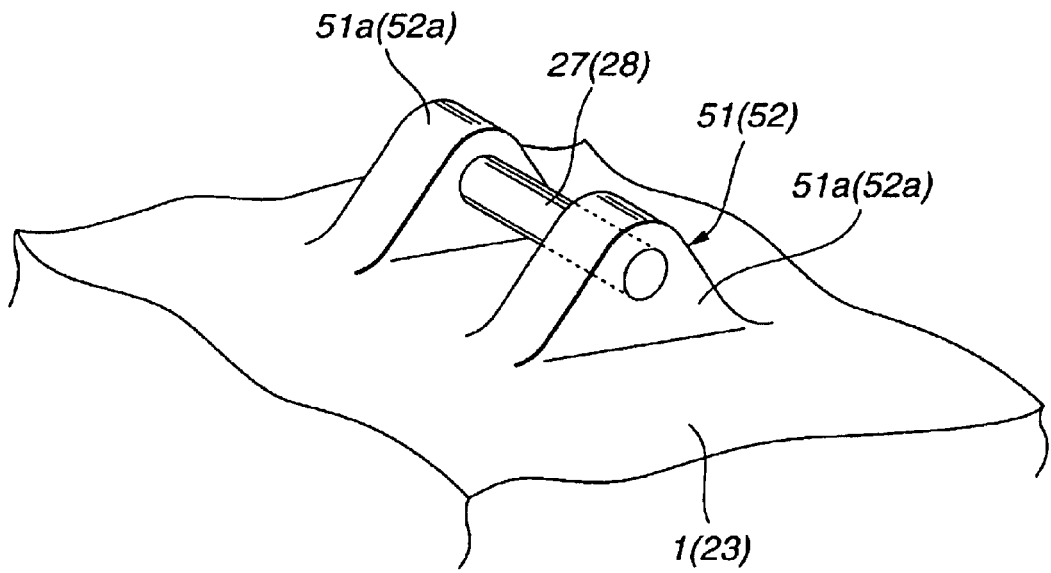
FIG. 8 is a view similar to FIG. 4, but showing a modification of the second embodiment.

Referring now to FIG. 8, a modification of the structure of the second embodiment is explained. In the modification shown in FIG. 8, link support 51 for upper link 16 is integrally formed with transmission case 1, and link support 52 for lower link 17 is integrally formed with servo piston body 23. This can reduce the number of parts of the toroidal CVT.

Figure 9:
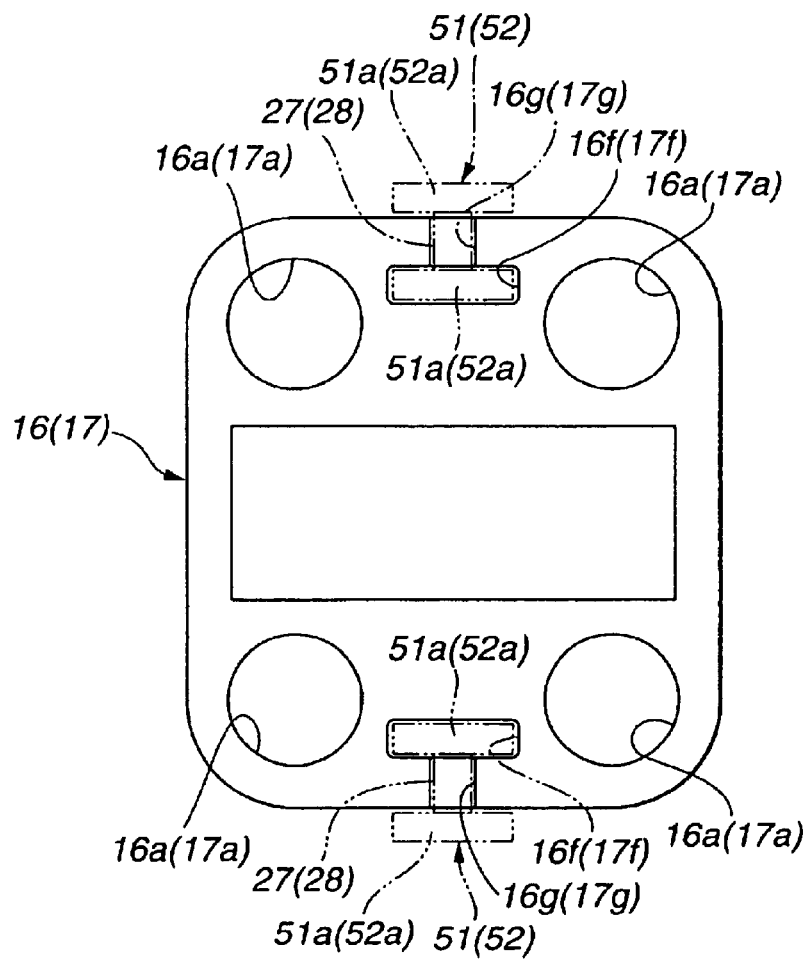
FIG. 9 is a plan view of the power rollers support structure according to a third embodiment of the present invention.

Referring to FIG. 9, a third embodiment of the invention will be explained hereinafter, which differs in arrangement of link supports 51 and 52 and pin guides 16g and 17g from the second embodiment. As illustrated in FIG. 9, link supports 51 and 52 are arranged such that one of opposed arms 51a and 52a of each of link supports 51 and 52 is positioned outside each of links 16 and 17. Specifically, the one of opposed arms 51a and 52a of each link support 51 and 52 is placed adjacent to an outer peripheral edge of each link 16 and 17. The other of opposed arms 51a and 52a of each of link supports 51 and 52 is inserted into link support insertion holes 16f and 17f formed in each of links 16 and 17. Pin guides 16g for pins 27 and pin guides 17g for pins 28 are in the form of grooves extending from link support insertion holes 16f and 17f to the outer peripheral edges of links 16 and 17 adjacent to the one of opposed arms 51a and 52a. In this embodiment, link support insertion holes 16f and 17f are formed to receive only the one of opposed arms 51a and 52a of each of link supports 51 and 52, so that links 16 and 17 can be increased in rigidity and cost-saving as compared with the second embodiment. The assembly operation of the toroidal CVT having the power rollers support structure of the third embodiment can be performed in the same manner as described in the first embodiment.

Meanwhile, if link supports 20, 21, 51 and 52 are made of aluminum-based material as used for transmission case 1 and servo piston body 23, pins 27 and 28 may be made of iron-based material. In this case, the power rollers support structure can be enhanced in abrasion resistance and durability and can be reduced in weight. Pins 27 and 28 may be press-fitted to links 16 and 17 in the first embodiment and to link supports 51 and 52 in the second embodiment, the modification and the third embodiment.

This application is based on Japanese Patent Application No. 2001-285093 filed on Sep. 19, 2001, the entire content of which, inclusive of the specification, claims and drawings, is incorporated by reference herein.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A toroidal continuously variable transmission, comprising:
    input and output disks rotatable about a common rotation axis;
    power rollers interposed between the input and output disks;
    trunnions supporting the power rollers to allow the power rollers to rotate about a rotation axis, respectively, the trunnions being displaceable along a longitudinal axis which extends perpendicular to the common rotation axis of the input and output disks and the rotation axis of the power rollers, the trunnions being pivotally moveable about the longitudinal axis together with the power rollers by cooperation with rotation of the input and output disks;
    a link connecting the trunnions;
    a link support supporting the link to allow the displacement of the trunnions along the longitudinal axis and the pivotal movement of the trunnions about the longitudinal axis; and
    a pin extending in a direction parallel to the common rotation axis of the input and output disks, the pin being disposed on one of the link and the link support;
    the other of the link and the link support being formed with a groove extending in a direction parallel to the longitudinal axis of the trunnions, the groove having an open end open to a surface of the other of the link and the link support, the open end of the groove being open to the surface of the other of the link and the link support in a direction parallel to the longitudinal axis of the trunnions, the pin being permitted to be radially inserted into the groove through the open end of the groove in the direction parallel to the longitudinal axis of the trunnions,
    the pin and the groove cooperating to hold the link in place in a direction perpendicular to the common rotation axis of the input and output disks and support the link to allow the link to swing about the pin and offset in the direction parallel to the longitudinal axis of the trunnions.

2. The toroidal continuously variable transmission as claimed in claim 1, wherein the pin is disposed on the link, the groove being formed in the link support, the open end of the groove being open to a surface of the link support which is located closer to the common rotation axis.

3. The toroidal continuously variable transmission as claimed in claim 2, wherein the link is formed with a link support insertion hole engaged with the link support, the pin extending across the link support insertion hole.

4. The toroidal continuously variable transmission as claimed in claim 1, wherein the pin is disposed on the link support, the groove being formed in the link, the open end of the groove being open to a surface of the link which is located farther apart from the common rotation axis of the input and output disks.

5. The toroidal continuously variable transmission as claimed in claim 4, wherein the link support comprises two arms retaining opposed ends of the pin, the link being formed with link support insertion holes engaged with the arms, the groove extending between the link support insertion holes.

6. The toroidal continuously variable transmission as claimed in claim 4, wherein the link support comprises two arms retaining opposed ends of the pin, the link including a link support insertion hole engaged with one of the arms and a peripheral edge which is located adjacent to the other of the arms, the pin guide extending from the link support insertion hole to the peripheral edge of the link.

7. The toroidal continuously variable transmission as claimed in claim 1, wherein the groove has a chamfered edge at the open end, the chamfered edge being configured to facilitate the radial insertion of the pin.

8. The toroidal continuously variable transmission as claimed in claim 1, further comprising a transmission case to which the link support is fixed.

9. The toroidal continuously variable transmission as claimed in claim 8, further comprising a servo piston body secured to the transmission case, the link support is fixed to the servo piston body.

10. A method of assembling a toroidal continuously variable transmission including a transmission case having a bottom opening, a toroidal speed change unit disposed within the transmission case, the toroidal speed change unit including input and output disks rotatable about a common first axis, power rollers interposed between the input and output disks, trunnions supporting the power rollers to allow the power rollers to rotate about a second axis, respectively, the trunnions being displaceable along a longitudinal axis which extends perpendicular to the common rotation axis of the input and output disks and the rotation axis of the power rollers, the trunnions being pivotally moveable about the longitudinal axis together with the power rollers by cooperation with rotation of the input and output disks, a link connecting the trunnions, a link support supporting the link to allow the displacement of the trunnions along the longitudinal axis and the pivotal movement of the trunnions about the longitudinal axis, and a pin extending in a direction parallel to the common rotation axis of the input and output disks, the pin being disposed on one of the link and the link support, the other of the link and the link support being formed with a groove extending in a direction parallel to the longitudinal axis of the trunnions, the groove having an open end open to a surface of the other of the link and the link support, the open end of the groove being open to the surface of the other of the link and the link support in a direction parallel to the longitudinal axis of the trunnions, the pin and the groove cooperating to hold the link in place in a direction perpendicular to the common rotation axis of the input and output disks and support the link to allow the link to swing about the pin and offset in the direction parallel to the longitudinal axis of the trunnions, the method comprising:
    placing the transmission case at an upset state such that the bottom opening is located on an upper side of the transmission case;
    inserting the link into the transmission case through the bottom opening and mounting the link to the trunnions; and
    radially inserting the pin into the groove through the open end of the groove in the direction parallel to the longitudinal axis of the trunnions to thereby mount the link to the link support.

11. The method as claimed in claim 10, further comprising inserting the link support into the transmission case through the bottom opening and fixing the link support to the transmission case.

12. The method as claimed in claim 11, further comprising a servo piston body secured to the transmission case, the fixing operation comprising fixing the link support to the servo piston body.

13. The method as claimed in claim 10, wherein the pin is disposed on the link, the groove being formed in the link support, the open end of the groove being open to a surface of the link support which is located closer to the common rotation axis of the input and output disks.

14. The method as claimed in claim 13, wherein the link is formed with a link support insertion hole engaged with the link support, the pin extending across the link support insertion hole.

15. The method as claimed in claim 10, wherein the pin is disposed on the link support, the groove being formed in the link, the open end of the groove being open to a surface of the link which is located farther apart from the common rotation axis of the input and output disks.

16. The method as claimed in claim 15, wherein the link support comprises two arms retaining opposed ends of the pin, the link being formed with link support insertion holes engaged with the arms, the groove extending between the link support insertion holes.

17. The method as claimed in claim 15, wherein the link support comprises two arms retaining opposed ends of the pin, the link including a link support insertion hole engaged with one of the arms and a peripheral edge which is located adjacent to the other of the arms, the groove extending from the link support insertion hole to the peripheral edge of the link.

18. The method as claimed in claim 10, wherein the groove has a chamfered edge at the open end, the chamfered edge being configured to facilitate the radial insertion of the pin.

* * * * *